UNITED STATES PATENT OFFICE 2,401,196

DICARBOXYLIC SALTS OF POLYHYDROXY TERTIARY AMINES

Murray Senkus, Terre Haute, Ind., assignor to Commercial Solvents Corporation, Terre Haute, Ind., a corporation of Maryland No Drawing. Application June 2, 1944, Serial No. 538,563

8 Claims. (Cl. 260—534)

My invention relates to new and useful chemical compounds and to a process for the preparation thereof. More particularly, it is concerned with dicarboxylic salts of polyhydroxy tertiary amines and the preparation thereof from 1-aza-3,7-dioxabicyclo [3.3.0] octanes. The dicarboxylic salts of polyhydroxy tertiary amines of the present invention may be represented by the following general structural formula:

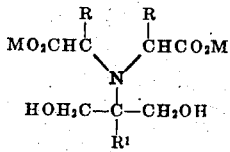

in which R is hydrogen or an alkyl group; the substituent $R^1$ may be either hydrogen, hydroxymethyl or alkyl; and M represents an alkali metal.

As examples of dicarboxylic salts of polyhydroxy tertiary amines included by the above generic formula, there may be mentioned sodium 2-(dihydroxy-t-butyl) - 2 - azapropane-1,3-dicarboxylate, sodium 2-(trihydroxy-t-butyl)-1,3-dipropyl - 2-azapropane-1,3-dicarboxylate, sodium 2-(2,2'-dihydroxyisopropyl) - 2 - azapropane-1,3-dicarboxylate, potassium 2 -(2,2' - dihydroxyisopropyl) - 2 - azapropane-1,3-dicarboxylate, potassium 2 -(1 - hydroxymethyl - 1-ethyl-2-hydroxyethyl) -2-azapropane-1,3-dicarboxylate, and the like.

Compounds of the above type may be readily synthesized by reacting a suitable 1-aza-3,7-dioxabicyclo [3.3.0] octane with hydrogen cyanide at a temperature of approximately 0° C. The latter is added slowly to the 1-aza-3,7-dioxabicyclo [3.30] octane and the reaction mixture maintained at the aforesaid temperature by means of external cooling. After all of the hydrogen cyanide has been added, the reaction is generally found to be complete. Thereafter, the reaction mixture is warmed to approximately 30° and air passed through it for a period of two or three hours in order to remove any excess hydrogen cyanide. The resulting product, which is a polyhydroxy bis(cyanoalkyl) amine, is then subjected to a hydrolysis treatment by heating to from about 80° to about 100° C. in the presence of an aqueous alcoholic solution of a suitable alkali metal hydroxide such as sodium or potassium hydroxides. This mixture is heated until the odor of ammonia is no longer perceptible. On cooling, the solid crystalline alkali metal salt of the dicarboxylic acid is observed to precipitate. The salt thus obtained may be purified further by recrystallization from water or other suitable solvents.

These reactions may be represented by the following scheme in which the action of HCN causes cleavage of the bicyclic rings as indicated

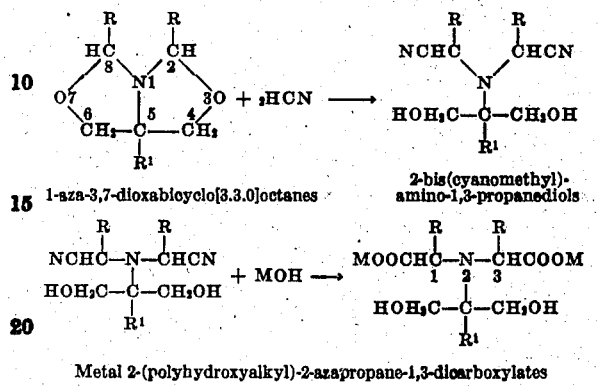

Metal 2-(polyhydroxyalkyl)-2-azapropane-1,3-dicarboxylates

The bicyclic compounds from which the new carboxylic salts of my invention may be prepared are named in accordance with the nomenclature suggested for two ring systems in Chapter II of "The Ring Index" by Patterson and Capell and A. C. S. Monograph published by Reinhold Publishing Company in 1940. The carboxylic salts are conveniently named as derivatives of the chain to which the acid functional groups are attached, namely as derivatives of 2-azapropane which is a heterochain comprising 2 carbons and a nitrogen in the intermediate, or 2, position. These carboxylic salts might also be named as amino derivatives of 1,3-propanediol for example as 2-bis(1-carboxyalkyl) amino-1,3-propanediols. The former nomenclature is preferred to emphasize the functional carboxy groups.

The 1-aza-3,7-dioxabicyclo [3.3.0] octanes utilized in preparing the new compounds of my invention may be conveniently prepared in accordance with the procedure described in my copending application, U. S. Serial No. 441,021, filed April 29, 1942. By the method there described, such compounds can be readily prepared by distilling a mixture consisting of an equivalent quantity of an amino dihydroxy or amino trihydroxy compound and approximately two equivalents of the desired aldehyde, at atmospheric pressure until substantially all of the water formed during the reaction is distilled off. The residue thus obtained is further refined by fractionation at reduced pressure. While the preferred ratio of reactants consists of two moles of aldehyde per mole of amino polyhydroxy compound, it has been found desirable in certain instances, to employ an excess of the aldehyde. Likewise, it is sometimes desirable to add to the reaction mixture, a liquid, such as benzene or toluene, which is capable of removing the water produced during the formation of the 1-aza-3,7-dioxabicyclo [3.3.0]-octanes as a constant-boiling mixture with said liquid.

The examples which follow illustrate certain compounds typical of the class described above. However, it is to be specifically understood that such examples are not to be in any way construed as limiting my invention, since I have found that the reaction here involved between hydrogen cyanide and the 1-aza-3,7-dioxabicyclo [3.3.0] octane is very general and may be readily effected.

Example I

One hundred grams of liquid hydrogen cyanide was slowly added while stirring, to 100 grams of 5-methyl-1-aza-3,7-dioxabicyclo [3.3.0] octane. The reaction vessel was immersed in an ice bath during the addition of the hydrogen cyanide. After all of the latter compound had been introduced, the reaction mixture was heated to room temperature and air was passed through it for 2 hours in order to remove the excess hydrogen cyanide. The product, 2-bis(cyanomethyl)amino-2-methyl-1,3-propanediol, weighed 142 grams, corresponding to a yield of 100%, calculated on the basis of 5-methyl-1-aza-3,7-dioxabicyclo [3.3.0] octane utilized. A mixture of 30 grams of 2-bis(cyanomethyl)amino-2-methyl-1,3-propanediol, 10 grams of water, 15 grams of sodium hydroxide and 300 cc. of methanol was heated on the steam bath until the odor of ammonia could no longer be detected. On cooling, a solid precipitated, and thereafter was filtered and dried. The dried sodium 2-(dihydroxy-t-butyl)-2-azapropane-1,3-dicarboxylate thus obtained weighed 60 grams, corresponding to a yield of 75% calculated on the basis of 2-bis(cyanomethyl)amino-2-methyl-1,3-propanediol. The sodium salt produced in this manner was purified further by recrystallizing twice from water.

Analysis. Calculated for $C_8H_{13}NO_6Na_2$: N, 5.28. Found: N, 5.10.

Example II

To 100 grams of 5-hydroxymethyl-1-aza-3,7-dioxabicyclo [3.3.0] octane, was slowly added, in the presence of agitation, 90 grams of liquid hydrogen cyanide. Throughout the addition of hydrogen cyanide, the reaction vessel was immersed in an ice bath. When all of the acid had been added, the temperature of the reaction mixture was raised to 30° C., after which a strong current of air was blown through it for approximately 2½ hours to remove the excess hydrogen cyanide. The reaction product, 2-bis(cyanomethyl)amino-tris(hydroxymethyl)methane, was produced in 90% yield, based upon the 5-hydroxymethyl - 1 - aza - 3,7 - dioxabicyclo [3.3.0] octane employed. A mixture consisting of 33 grams of 2-bis(cyanomethyl)amino-tris(hydroxymethyl)methane, 12 grams of water, 21 grams of potassium hydroxide, and 300 cc. of methanol was next heated on a steam bath until the odor of ammonia could no longer be detected. On cooling, a white solid precipitated. The resulting potassium 2-(trihydroxy-t-butyl)-2-azapropane-1,3-dicarboxylate was filtered and dried, the dried product weighing 36 grams, and corresponded to a yield of approximately 70%, based on 2 - bis(cyanomethyl)amino - tris(hydroxymethyl)methane. After being recrystallized twice from water, the potassium salt gave the following analysis:

Calculated for $C_8H_{13}NO_7K_2$: N, 4.48. Found: N, 4.41.

Example III

In accordance with the procedure of the foregoing examples, 2-bis(1-cyanobutyl)amino-1,3-propanediol was prepared from 100 grams of 2,8-dipropyl-1-aza-3,7-dioxabicyclo [3.3.0] octane and 60 grams of liquid hydrogen cyanide in 93% yield, calculated on the basis of 2,8-dipropyl-1-aza-3,7-dioxabicyclo [3.3.0] octane utilized. A mixture containing 44.4 grams of 2-bis(1-cyanobutyl)amino-1,3-propanediol, 10 grams of water, 15 grams of sodium hydroxide, and 300 cc. of methanol was then heated on the steam bath until the last traces of ammonia had been driven off. On cooling, the solid sodium 5-(2,2'-dihydroxyisopropyl) - 5 - aza-4,6-nonanedicarboxylate precipitated. After filtering, drying and recrystallization twice from water, the product was obtained in 75% yield, based on the quantity of 2-bis(1-cyanobutyl)amino - 1,3 - propanediol utilized.

Analysis. Calculated for $C_{13}H_{23}NO_6Na_2$: N, 4.18. Found: N, 4.10.

It is to be strictly understood, of course, that my invention is not limited to the compounds disclosed in the specific examples given above. Also, it will be apparent that certain modifications in the procedure utilized in preparing such compounds may be made without departing from the spirit of the present invention.

Now having described my invention, what I claim is:

1. Dicarboxylic salts of polyhydroxy tertiary amines having the formula:

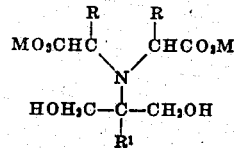

in which R is a member of the group consisting of hydrogen and alkyl; the substituent $R^1$ is a member selected from the group consisting of hydrogen, hydroxymethyl, and alkyl; and M represents an alkali metal.

2. Sodium 2-dihydroxy-t-butyl)-2-azapropane-1,3-dicarboxylate.

3. Potassium 2-(trihydroxy-t-butyl)-2-azapropane-1,3-dicarboxylate.

4. Sodium 5-(2,2'-dihydroxyisopropyl)-5-aza-4,6-nonanedicarboxylate.

5. The process of preparing dicarboxylic alkali metal salts of polyhydroxy tertiary amines having the structural formula:

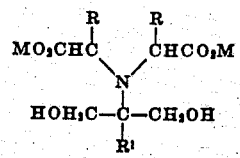

in which R is a member of the group consisting of hydrogen and alkyl; $R^1$ represents a member selected from the group consisting of hydrogen, hydroxymethyl and alkyl; and M is an alkali metal, which comprises reacting hydrogen cyanide with a 1-aza-3,7-dioxabicyclo [3.3.0] octane having the following formula

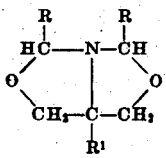

wherein the R substituents are as defined above to produce the corresponding polyhydroxy alkyl bis(cyanoalkyl)amine and thereafter hydrolyzing the latter by heating in the presence of an alkali metal hydroxide to produce a dicarboxylic alkali metal salt of a polyhydroxy tertiary amine.

6. The process of producing sodium 2-(dihydroxy-t-butyl)-2-azapropane-1,3 - dicarboxylate, which comprises reacting 5 - methyl - 1 - aza-3,7-dioxabicyclo [3.3.0] octane with hydrogen cyanide to produce 2-bis(cyanomethyl)amino-2-methyl-1,3-propanediol and thereafter hydrolyzing the latter by heating in the presence of sodium hydroxide to produce sodium 2-(dihydroxy-t-butyl)-2-azapropane-1,3-dicarboxylate.

7. The process of preparing potassium 2-(trihydroxy-t-butyl) - 2 - azapropane - 1,3 - dicarboxylate, which comprises reacting hydrogen cyanide with 5-hydroxymethyl-1-aza-3,7-dioxabicyclo [3.3.0] octane to produce 2-bis(cyanomethyl)amino - tris (hydroxymethyl)methane and thereafter hydrolyzing the latter by heating in the presence of potassium hydroxide to produce potassium 2-(trihydroxy-t-butyl)- 2 - azapropane-1,3-dicarboxylate.

8. The process of preparing sodium 5-(2,2'-dihydroxyisopropyl) - 5 - aza - 4,6 - nonanedicarboxylate, which comprises reacting hydrogen cyanide with 2,8-dipropyl-1-aza-3,7-dioxabicyclo [3.3.0] octane to produce 2-bis(1-cyanobutyl)-amino-2-azapropane-1,3-propanediol and thereafter hydrolyzing the latter by heating in the presence of sodium hydroxide to produce sodium 2-(1-hydroxymethyl-2-hydroxyethyl)-2-aza- 1,3-dipropyl-1,3-propanedicarboxylate.

MURRAY SENKUS.